United States Patent
Lim et al.

(10) Patent No.: US 9,558,030 B2
(45) Date of Patent: Jan. 31, 2017

(54) METHOD, APPARATUS, AND SYSTEM TO HANDLE TRANSACTIONS RECEIVED AFTER A CONFIGURATION CHANGE REQUEST

(75) Inventors: Su Wei Lim, Klang (MY); Kah Meng Yeem, Folsom, CA (US); Poh Thiam Teoh, Seri Damansara (MY); Hooi Kar Loo, Bayan Lepas (MY); Sujea Lim, Bintangor (MY)

(73) Assignee: Intel Corporation, Santa Clara, CA (US)

( * ) Notice: Subject to any disclaimer, the term of this patent is extended or adjusted under 35 U.S.C. 154(b) by 799 days.

(21) Appl. No.: 13/997,619

(22) PCT Filed: Nov. 9, 2011

(86) PCT No.: PCT/US2011/060015
§ 371 (c)(1),
(2), (4) Date: Jun. 24, 2013

(87) PCT Pub. No.: WO2013/070214
PCT Pub. Date: May 16, 2013

(65) Prior Publication Data
US 2013/0275985 A1    Oct. 17, 2013

(51) Int. Cl.
*G06F 3/00* (2006.01)
*G06F 5/00* (2006.01)
(Continued)

(52) U.S. Cl.
CPC ............... *G06F 9/46* (2013.01); *G06F 3/0659* (2013.01); *G06F 5/06* (2013.01); *G06F 5/10* (2013.01);
(Continued)

(58) Field of Classification Search
None
See application file for complete search history.

(56) References Cited

U.S. PATENT DOCUMENTS 6,754,751 B1 *  6/2004  Willke ................ G06F 13/1621
                                                710/112
8,223,745 B2 *  7/2012  Johnsen ............. H04L 12/4625
                                                370/328
(Continued)

FOREIGN PATENT DOCUMENTS

KR      1020030011392        2/2003

OTHER PUBLICATIONS

International Search Report and Written Opinion for Application No. PCT/US2011/060015 dated Jul. 31, 2012, 7 pages.
(Continued)

*Primary Examiner* — Lewis A Bullock, Jr.
*Assistant Examiner* — Mark Gooray
(74) *Attorney, Agent, or Firm* — Blakely, Sololoff, Taylor & Zafman LLP

(57) ABSTRACT

Methods, apparatuses, and systems for handling transactions received after a configuration request, the method, for example, comprising: receiving a configuration change request by a transaction-handling logic block; performing a configuration change by the transaction-handling logic block in response to the configuration change request, wherein the logic block is to handle transactions received prior to receipt of the configuration change request differently than transactions received after receipt of the configuration change request; receiving, by the transaction-handling logic block, a first transaction before receiving the configuration change request; receiving, by the transaction-handling logic block, a second transaction after receiving the configuration change request and before the configuration change is complete; differentiating the first transaction from the second transaction based on the order in which the first and second transactions were received relative to receipt of
(Continued)

the configuration change request; and handling the first and second transactions.

20 Claims, 6 Drawing Sheets

(51) Int. Cl.
*G06F 9/44* (2006.01)
*G06F 9/46* (2006.01)
*G06F 3/06* (2006.01)
*G06F 5/06* (2006.01)
*G06F 13/16* (2006.01)
*G06F 5/10* (2006.01)
*G06F 5/12* (2006.01)
*G06F 12/00* (2006.01)
*G06F 13/14* (2006.01)

(52) U.S. Cl.
CPC ................ *G06F 5/12* (2013.01); *G06F 9/461* (2013.01); *G06F 9/466* (2013.01); *G06F 12/00* (2013.01); *G06F 13/14* (2013.01); *G06F 13/1621* (2013.01); *G06F 13/1642* (2013.01)

(56) References Cited

U.S. PATENT DOCUMENTS

| | | |
|---|---|---|
| 2002/0019903 A1 | 2/2002 | Lin |
| 2005/0251612 A1 | 11/2005 | Creta et al. |
| 2012/0017025 A1* | 1/2012 | Luk .................. G06F 13/4282 710/313 |

OTHER PUBLICATIONS

International Preliminary Report on Patentability for Application No. PCT/US2011/060015 dated May 13, 2014, 6 pages.

* cited by examiner

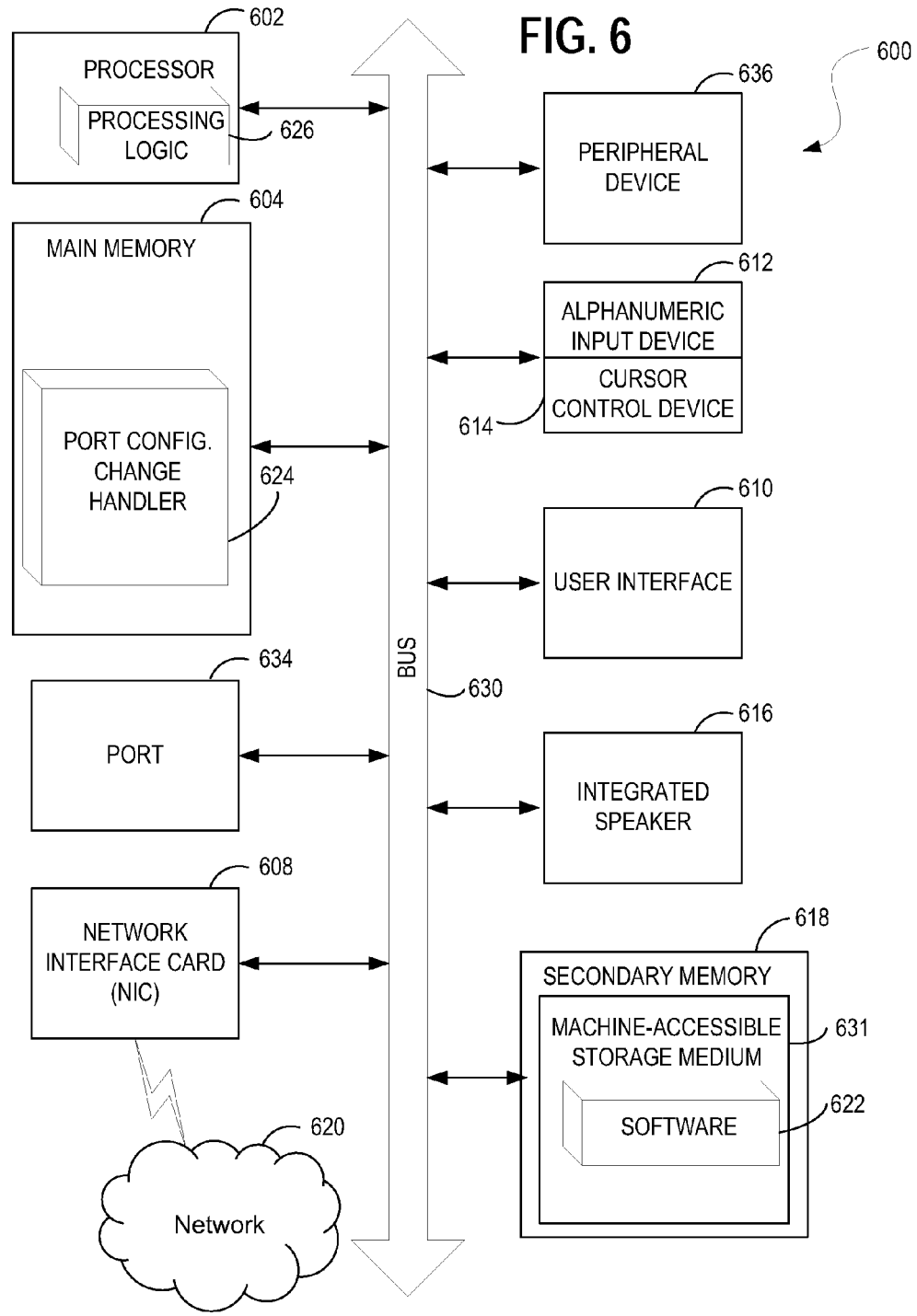

METHOD, APPARATUS, AND SYSTEM TO HANDLE TRANSACTIONS RECEIVED AFTER A CONFIGURATION CHANGE REQUEST

CLAIM OF PRIORITY

This application is a U.S. National Phase application under 35 U.S.C. §371 of International Application No. PCT/US2011/060015, filed Nov. 9, 2011, entitled METHOD, APPARATUS, AND SYSTEM TO HANDLE TRANSACTIONS RECEIVED AFTER A CONFIGURATION CHANGE REQUEST, the entire contents of which are incorporated herein by reference.

TECHNICAL FIELD

Embodiments relate generally to the field of computing, and more particularly, individual handling of a continuous stream of transactions received by a module when the module is undergoing reconfiguration.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also correspond to disclosed embodiments.

In the field of computing, systems generally utilize a plurality of modules to perform different functions. The plurality of modules in a system may need to exchange information with one another. Additionally, systems may need to exchange information with other systems. Systems and modules may exchange information with one another through transactions.

Systems and modules of systems often have different configurations. For example, a device may undergo a reset. Other modules or systems may be impacted when one module or system is reconfigured. For example, a device undergoing a reset may refuse to accept additional transactions from other modules or systems. It may be desirable to handle transactions in such a way that the reconfiguration of one module or system does not impact the performance of other modules or systems.

Additionally, a module or system's handling of transactions may depend on support from or specific functionality of other modules or systems. Handling transactions via a method that does not depend on the support or specific functionality of other modules or systems may be desirable for increased scalability and portability.

BRIEF DESCRIPTION OF THE DRAWINGS

Embodiments of the present invention are illustrated by way of example, and not by way of limitation, and can be more fully understood with reference to the following detailed description when considered in connection with the figures in which:

FIG. 6 illustrates a diagrammatic representation of a machine in the exemplary form of a computer system, in accordance with one embodiment.

DETAILED DESCRIPTION

Figure 1:
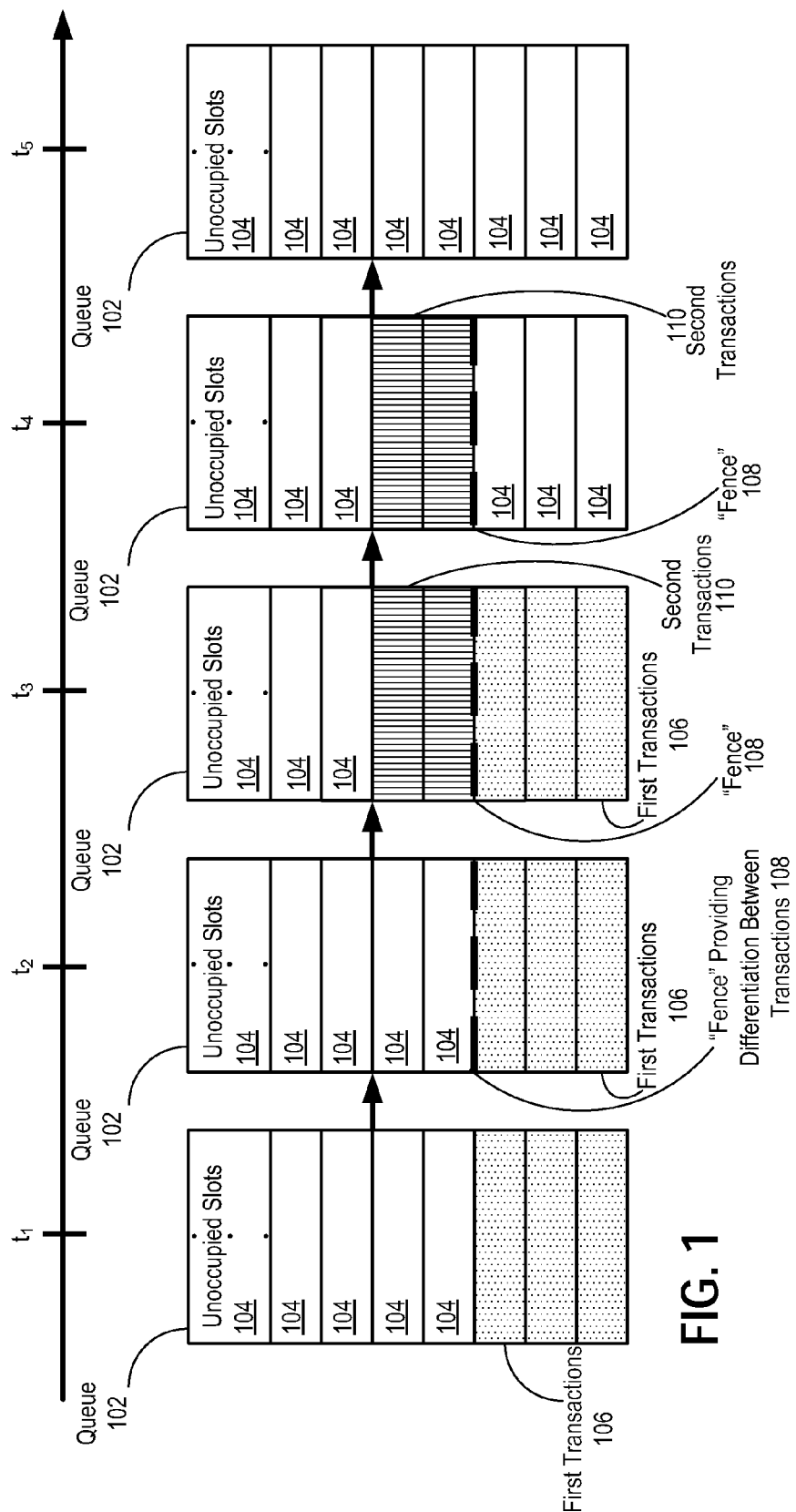
FIG. 1 depicts a chronological diagram of an exemplary queue with a mechanism for differentiating amongst received transactions.

Described herein are methods, apparatuses, and systems for handling transactions received after a configuration request. For example, mechanisms include differentiating the handling for transactions received prior to receipt of a configuration change request from the handling for transactions received after receipt of a configuration change request. In one embodiment, such a mechanism may include a fencing mechanism for a queue.

When software, firmware, or hardware initiates a change in the configuration of hardware, the configuration change could impact the hardware's handling of transactions. The term "transactions" refers to one or more packets of information and/or messages which hardware modules and/or devices transmit and/or receive to exchange information. Hardware undergoing a configuration change which impacts the handling of transactions may be required to robustly handle transactions which were received prior to the configuration change request (either waiting to be processed or in middle of processing) differently than transactions received after the configuration change request. For example, a link down event (hardware or software-based) or a reset (for example, a software-based function-level reset) could result in such a configuration change request.

Some approaches to handling transactions during configuration changes depend upon specific bus protocols. In some systems, a bus protocol may enable hardware to have direct control regarding when it can throttle new transactions, for example, by retrying the new transactions on the bus while the hardware is processing and/or draining previously received transactions. Retrying a transaction may entail, for example, responding to a received transaction packet with a response packet requesting that the transaction packet be resent at a later time.

In other systems, a bus protocol may not provide hardware with the option to retry transactions. In one embodiment, a fencing mechanism, described herein, may be used to enable the graceful handling of configuration changes without dependency on bus support or capabilities (e.g., the option or ability to retry transactions). In one embodiment, a fencing mechanism fences current in-queue transactions and isolates newer incoming transactions received after a request for a configuration change. In one embodiment, a fencing mechanism enables the robust handling of software, firmware, and/or hardware initiated configuration changes. In one embodiment, a module with a fencing mechanism may be easily coupled to any bus or module, regardless of supported throttling mechanisms, while maintaining the ability of that module to undergo and/or perform configuration changes. In one such embodiment, scalable queue sizes and configuration change latencies are no longer a concern for the performance of configuration changes.

In one example, an embodiment of the fencing mechanism may be used for a PCI Express root port's link down handling. In one embodiment, the fencing mechanism provides a marker to differentiate between new incoming transactions from existing transactions in the queue prior to link down. The marker for posted and non-posted transactions from the fencing mechanism may allow a PCI Express root port to continue receiving transaction packets (without indicating a retry on the bus) while allowing the PCI Express root port to process transactions received prior to the link down, which may take a considerable amount of time.

In one such embodiment, the fencing mechanism also may allow the hardware to track pending non-posted requests to system memory such that all of the completions corresponding to non-posted requests issued prior to link down are gracefully handled. In one such embodiment, each of the non-posted requests issued to system memory would be tagged by a marker in a completion pre-allocation queue such that when the completion comes back (which may be a considerable time after the link down event), the completion is gracefully dropped instead of being forwarded to the device and resulting in an unexpected completion.

In one embodiment, a fencing mechanism may also provide the additional advantage of scalability, for example, by making the solution independent of a transmit queue depth. For example, without fencing, a bus which is coupled with a module undergoing a configuration change may be repetitively retried over a long period of time while waiting for completion of all entries in a transmit queue received prior to a configuration change. Retrying transactions may cause back-throttling on the bus and introduce operational inefficiency. In one embodiment with a fencing mechanism, new transactions received from the bus are continuously loaded into the transmit queue while the old transactions in the queue are being processed. Although one transmit queue is referred to in this example, other embodiments may use different types of queues, may use multiple queues, or may be implemented with any other mechanism which allows for the buffering of information.

Additionally, in one embodiment, fast back-to-back configuration changes of hardware may also be handled using a fencing mechanism which marks transactions relative to the back-to-back configuration changes.

Although PCI Express is used as one example when describing specific embodiments, other embodiments may be implemented for other hardware that undergoes configuration changes. For example, in one embodiment, a USB port may use the described mechanisms for a link configuration change, e.g., link connect to link disconnect. In such an embodiment, a USB design may use fencing mechanisms to fence a transaction received prior to link disconnection and trigger a different means to handle the new transactions received.

In a particular embodiment, mechanisms include: receiving a configuration change request by a transaction-handling logic block; performing a configuration change by the transaction-handling logic block in response to the configuration change request, wherein the logic block is to handle transactions received prior to receipt of the configuration change request differently than transactions received after receipt of the configuration change request; receiving, by the transaction-handling logic block, a first transaction before receiving the configuration change request; receiving, by the transaction-handling logic block, a second transaction after receiving the configuration change request and before the configuration change is complete; differentiating the first transaction from the second transaction based on the order in which the first and second transactions were received relative to receipt of the configuration change request; and handling the first and second transactions.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well known materials or methods have not been described in detail in order to avoid unnecessarily obscuring the disclosed embodiments.

In addition to various hardware components depicted in the figures and described herein, embodiments further include various operations which are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled with a computer system bus. The term "coupled" may refer to two or more elements which are in direct contact (physically, electrically, magnetically, optically, etc.) or to two or more elements that are not in direct contact with each other, but still cooperate and/or interact with each other.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts a chronological diagram 100 of an exemplary queue 102 with a mechanism 108 for differentiating amongst received transactions. In one embodiment, the queue 102 is implemented within a transaction-handling logic block. In such an embodiment, the transaction-handling logic block performs a configuration change on itself.

In one embodiment, the queue 102 is implemented within a device. In one embodiment, the queue 102 is implemented within a device controller. In another embodiment, the queue 102 is implemented within interface logic. In yet another embodiment, the queue 102 is implemented within a port or implemented via logic for such a port. In such an embodiment, the port is coupled with a device, a bus, and another module via the bus, wherein the device and the other module exchange information via transactions. In accordance with such an embodiment, the device is a multifunction device, for example, a multifunction PCI Express device. In accordance with such an embodiment, the port includes logic to handle transactions for the multifunction device, and further to change the configurations of each of the functions of the multifunction device.

In one embodiment, at t1, a transaction-handling logic block implementing the queue 102 has loaded first transactions 106 into the queue 102. In one embodiment, the queue 102 at t1 has unoccupied slots 104. After t1, and before the first transactions 106 are drained from the queue 102, a configuration change is initiated. In one embodiment, after a request for a configuration change is received, at t2, a fencing mechanism 108 is requested to fence the first transactions 106 in the queue 102. In one embodiment, the request for the configuration change is received from a source external to the transaction-handling logic block including the queue 102. In another embodiment, the request is generated by and received from the transaction-handling logic block itself. Similarly, a fencing request may be generated internally, and/or received from an external source.

In one embodiment, at t3, second transactions 110 are received and loaded into the queue 102. In one embodiment, the fencing mechanism 108 differentiates the first transactions 106 from the second transactions 110. In one embodiment, the fencing mechanism 108 isolates second transactions 110. In one embodiment, the second transactions are subsequent transactions received after initiation of the configuration change and will be fenced and categorized as transactions after fencing. In one embodiment, fencing is accomplished by storing the command load pointer as a fencing pointer prior to a configuration state change. In such an embodiment, a transaction received before the fencing pointer will drain normally, while a transaction received after the fencing pointer will be handled differently with respect to the new configuration change.

In one embodiment, the fencing will be considered complete after all of the first transactions 106 before fencing have successfully drained out from the queue 102.

In one embodiment in which the queue 102 is in a device controller, upon completion of fencing at t4, the device controller changes the configuration of a device coupled with the device controller, and handles the second transactions 110 (e.g., transactions after fencing and prior to the configuration change). In one embodiment, after fencing and after handling the second transactions 110, the queue 102 at t5 is drained and has unoccupied slots 104.

In one embodiment, the fence mechanism 108 for differentiating first transactions 106 from second transactions 110 enables the hardware which includes the queue 102 to continue receiving transactions after a configuration change is requested and/or initiated. In such an embodiment, the transaction-handling logic block does need not turn off or direct throttle the bus from which transactions are being received prior to performing configuration changes because transactions received before and after configuration changes can be isolated for independent handling.

Figure 2:
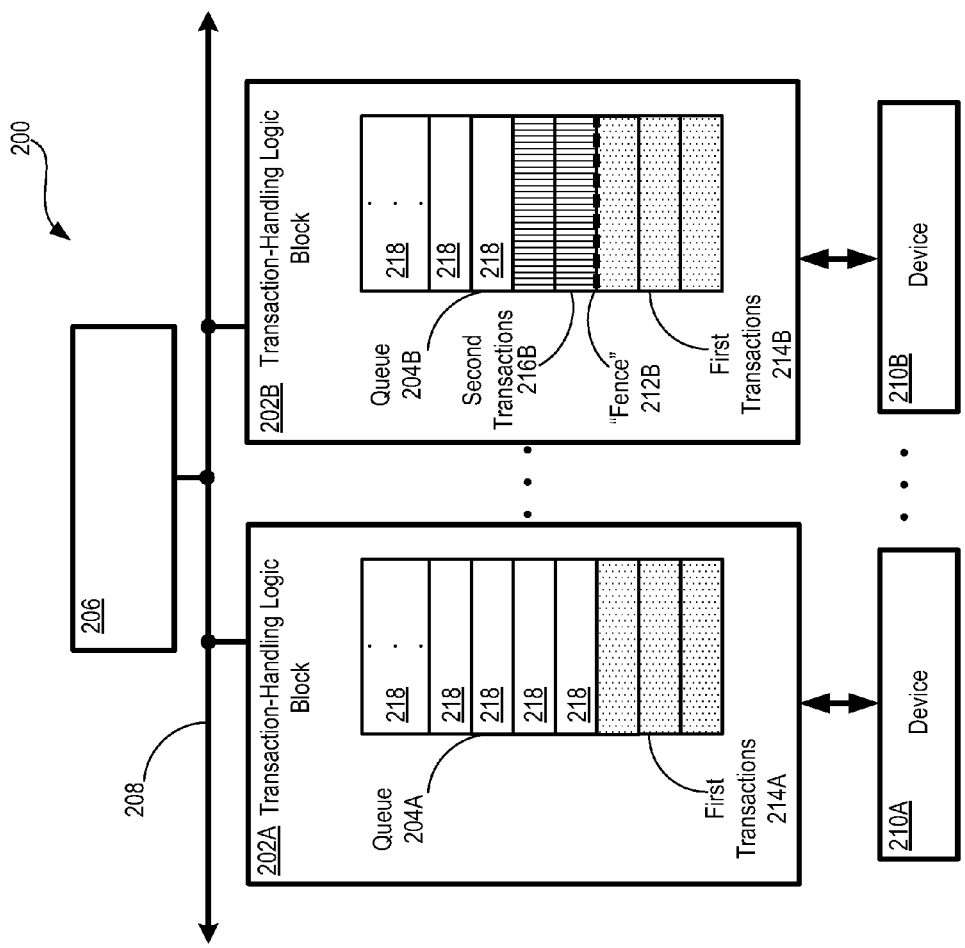
FIG. 2 depicts an exemplary system in which embodiments may operate.

FIG. 2 depicts an exemplary system 200 in which embodiments may operate. In one embodiment, the system 200 includes transaction-handling logic blocks 202A-202B. Although two transaction-handling logic blocks are shown, in other embodiments, the system 200 includes one or more transaction-handling logic blocks 202A-202B. In one embodiment, the transaction-handling logic blocks 202A-202B include queues 204A-204B, respectively. In one embodiment, the transaction-handling logic blocks 202A-202B are device controllers. In one embodiment, the transaction-handling logic blocks 202A-202B implement port logic.

In one embodiment, the transaction-handling logic blocks 202A-202B are coupled with another module 206 (e.g., via a bus 208). In one embodiment, the module 206 implements switching logic to enable the transaction-handling logic block to exchange information with other modules in the system 200. For example, in one embodiment, the module 206 is coupled with one or more processor cores, memory, and a storage device.

In one embodiment, the transaction-handling logic blocks 202A-202B are coupled with devices 210A-210B, respectively. In one such embodiment, the devices 210A-210B are multifunction PCI Express devices.

In one embodiment, the fencing mechanism 212B for differentiating transactions is used in a PCI Express link down flow. In one such embodiment, the transaction-handling logic blocks 202A-202B are PCI Express root ports. For example, first transactions 214A-214B may be ongoing transactions of the respective PCI Express devices 210A-210B, respectively.

In one such embodiment, the PCI Express devices 210A-210B are active, and device 210B is to undergo a configuration change by going through a link down flow. In one embodiment, all posted transactions targeting a PCI Express device that is link down are silently discarded, while non-posted transactions targeting a device that is link down are returned with 'Unsupported Request' completions. Without a differentiating mechanism 212B, an interface of the module 206 may be temporarily turned off, or an interface of the module 206 may be temporarily placed into a busy mode. Temporarily turning off or placing an interface and/or bus into a busy mode may cause negative performance impacts to the functions of a multifunction device that are still in active mode. Alternatively, a transaction-handling logic block without a differentiating mechanism (e.g., a fencing mechanism) may rely on software based solutions in which the software is expected not to initiate transactions at certain times. For example, software may be expected to not send transactions to a device during a configuration change, and/or after a link down transition. Relying on software to not initiate transactions at certain times may have the disadvantage of lacking robustness because, for example, a configuration change may occur that software is not aware of (e.g., configuration changes due to external factors for which there is no notification or indication provided to, or monitored by, the software). For example, software may be unaware of a PCI Express link down due to data corruption or due to a sudden malfunction of hardware which causes poor signal integrity to the physical link According to one embodiment, a fencing mechanism 212B enables other functions of a multifunction device not undergoing a configuration change to continue handling transactions, and thus reduces the performance impact associated with configuration changes. In such an embodiment, use of a fencing mechanism negates the need for software to have notice of hardware configuration changes.

In one embodiment where a configuration change corresponds to a link down transition for device 210B, differentiating logic makes a request to respective queues on that port, so that a fencing mechanism will begin to isolate first transactions 214B (e.g., existing transactions in the queue 204B) from second transactions 216B (e.g., new incoming transactions) prior to the link down configuration change. In one embodiment, the differentiating logic is implemented by the transaction-handling logic block.

In one embodiment, fencing mechanisms 212B are applied specifically to functions of a multifunction device 210B undergoing a configuration change. In one such embodiment, the configuration change is transparent to the active functions not undergoing configuration changes, and those active functions are not impacted by the configuration change of one of the functions. In one such embodiment, the active functions make forward progress to receive subsequent transactions without impacting performance.

In one embodiment, once the first transactions 214B and/or the second transactions 216B are isolated by fencing, the fencing will be considered complete after all the first transactions 214B (e.g., the outstanding transactions prior to the link down configuration change request) have completely drained out from the queue and have been sent to their respective targeted destinations. In one such embodiment, once the fencing mechanism is complete, the transaction-handling logic block 202B performs the configuration change. For example, in one such embodiment, the transaction-handling logic block 202B brings the link of device 210B to a link down state.

In one such embodiment, the second transactions 216B (e.g., transactions that had been isolated as being received after a link down configuration change request) are silently discarded if they are posted transactions, and will be completed with an 'Unsupported Request' status if they are non-posted transactions. Accordingly, in one embodiment, multifunction devices 210A-210B that are coupled with a primary interface of module 206 can undergo a configuration change on functions individually without impacting other functions that are not undergoing a configuration change.

Figure 3:
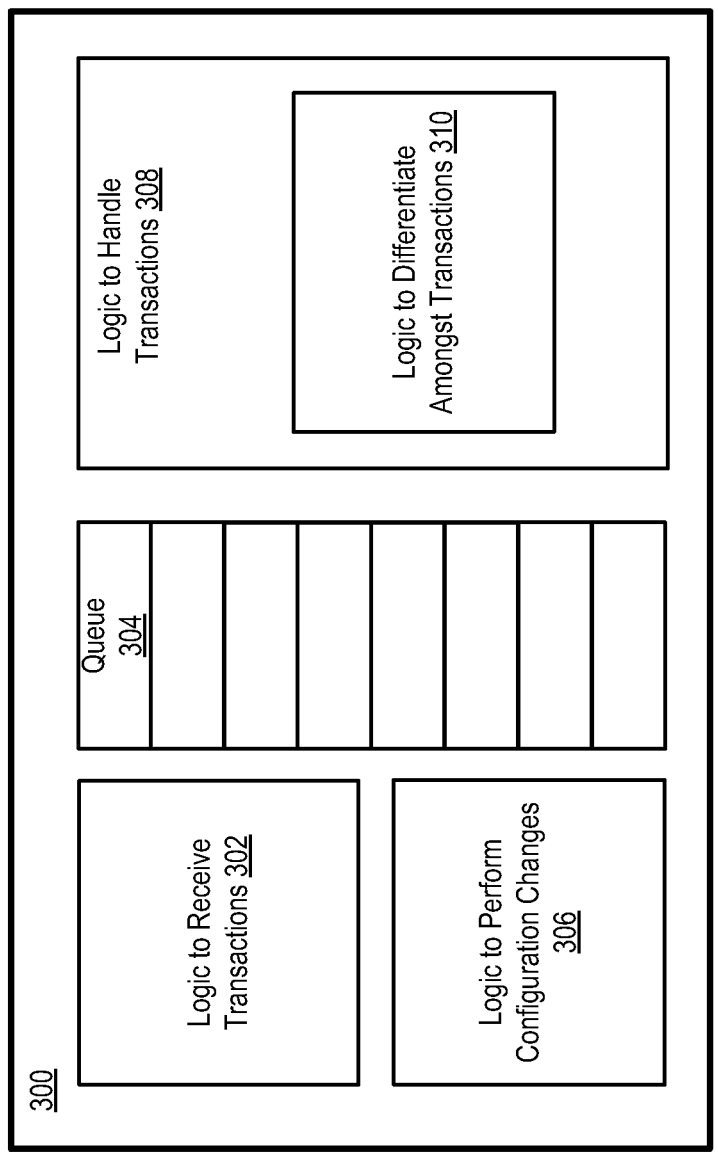
FIG. 3 depicts an exemplary apparatus in accordance with one embodiment.

FIG. 3 depicts an exemplary apparatus 300 in accordance with one embodiment. In one embodiment, the apparatus 300 is a transaction-handling logic block. In one embodiment, the apparatus 300 is a device controller. In one embodiment, the apparatus 300 is a port. In one embodiment, the apparatus 300 implements an interface.

In one embodiment, the apparatus 300 includes logic 302 to receive transactions, a queue 304, logic 306 to perform configuration changes, logic 308 to handle transactions, and logic 310 to differentiate amongst transactions. In other embodiments, some of the logic 302, 304, 306, 308, and 310 is located externally to the apparatus 300.

In one embodiment, the logic 302 to receive transactions receives transactions from another module via a bus with which the apparatus 300 is coupled.

In one embodiment, the queue 304 holds at least a portion of the received transactions. In another embodiment, the queue 304 holds all received transactions. In one embodiment, the queue 304 is one of a plurality of queues. In one embodiment, the queue 304 is a transmit queue to hold transactions for transmission to a device coupled with the apparatus 300.

In one embodiment, logic 306 performs configuration changes in response to configuration requests. In one embodiment, a configuration change request may be received by logic 302 in the form of, for example, a transaction (e.g., a program link down or link reset). In one embodiment, a configuration change request may be generated internally by the apparatus 300 (e.g., a link down generated within hardware by the link layer). In another embodiment, a configuration change request may be received via an out-of-band signal or a pin of the apparatus 300 (e.g., a side band request for entry into a different power state).

In one embodiment, logic 306 includes logic to perform a plurality of configuration changes, the plurality of configuration changes including at least a reset. In one such embodiment, the reset could be initiated by hardware or software. For example, a reset could be a software initiated function-level reset. In one embodiment, the plurality of configuration changes includes at least a link down transition. In one embodiment, the plurality of configuration changes further includes at least a link up transition. In one embodiment, there is a plurality of logic blocks to perform a plurality of configuration changes.

In one embodiment, logic 310 differentiates between first transactions and second transactions, wherein the first transactions are received prior to receipt of a configuration change request, wherein the second transactions are received after receipt of the configuration change request and before the configuration change is complete, and wherein the differentiation is based on the order in which the transactions were received relative to receipt of the configuration change request. In one embodiment, the logic 308 to handle transactions includes logic 310 to differentiate amongst transactions. In another embodiment, logic 310 is external to logic 308, but within apparatus 300. In yet another embodiment, a portion of logic 310 is within apparatus 300 and a portion of logic 310 is external to apparatus 300.

In one embodiment, logic 308 handles transactions differently according to the configuration of the apparatus 300. In one embodiment, the handling of transactions by logic 308 depends upon the configuration of a device coupled with the apparatus 300. For example, in one embodiment apparatus 300 includes PCI Express port logic which is coupled with a PCI Express device and logic 308 handles transactions differently when the PCI Express device is active (i.e., in a link up state) than when it is in a link down state.

In one embodiment, the apparatus 300 handles transactions for a plurality of modules and when logic 306 performs a configuration change for one of the plurality of modules, the remaining of the plurality of modules are to continue handling transactions during the configuration change for the one of the plurality of modules. In one such embodiment, each of the plurality of modules is a function of a multifunction PCI Express device. In other words, in one embodiment, the apparatus 300 handles transactions for a multifunction PCI Express device, and when logic 306 performs a configuration change for one function of the multifunction PCI Express device, the remaining functions not undergoing configuration changes are unaffected by the configuration change.

Figure 4:
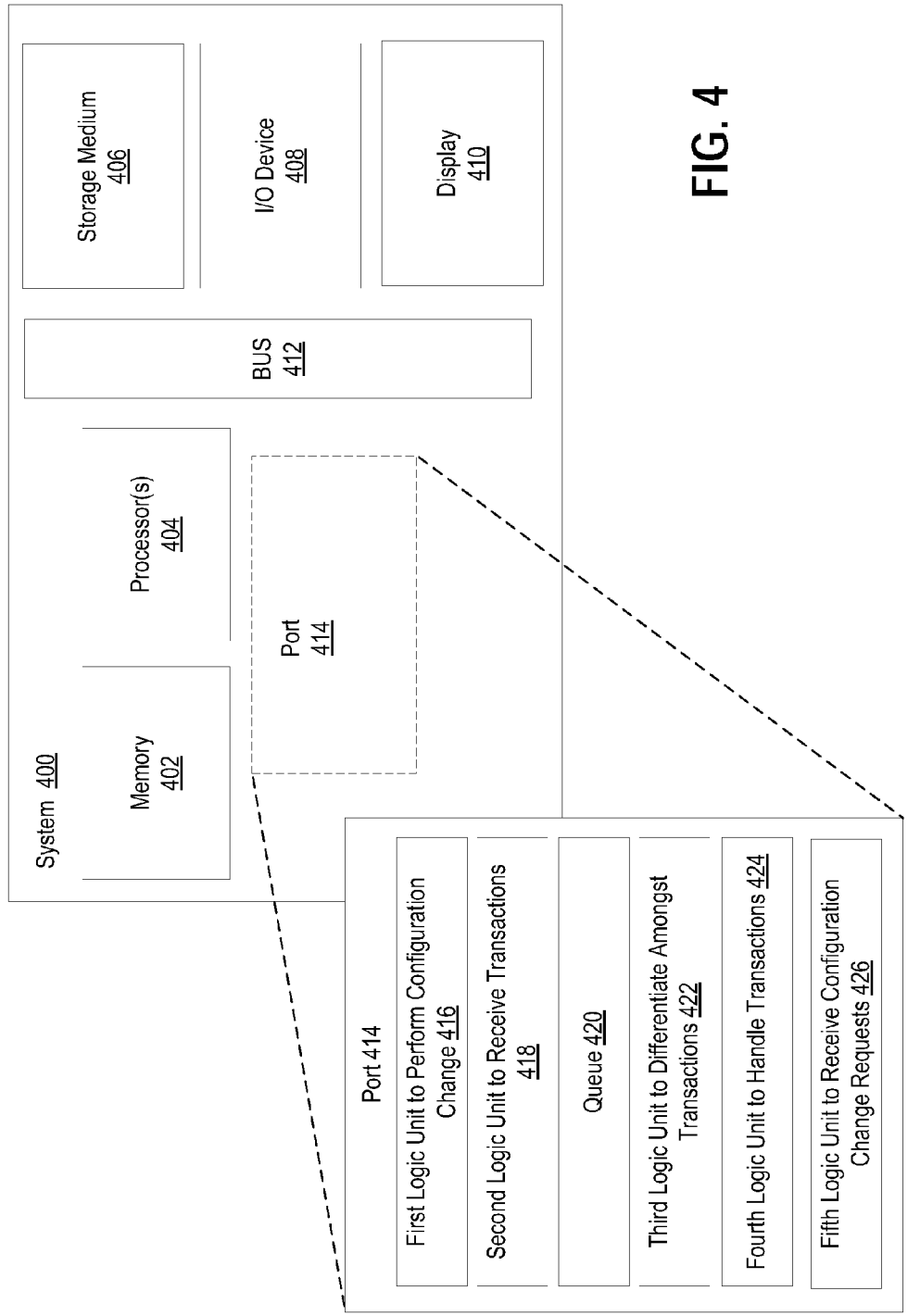
FIG. 4 depicts a diagrammatic representation of a system in which embodiments may operate, be installed, integrated, and/or configured.

FIG. 4 depicts a diagrammatic representation of a system 400 in which embodiments may operate, be installed, integrated, and/or configured. In one embodiment, the system 400 includes memory 402 and one or more processors 404. For example, memory 402 may store instructions to be executed and processor(s) 404 may execute such instructions. System 400 includes bus 412 to transfer transactions and data within system 400 among a plurality of peripheral devices communicably interfaced with bus 412.

System 400 further includes storage medium 406 to provide storage as necessary for the system 400, for example, to store data, which may be targeted by transactions, or software, which may initiate transactions. In one embodiment, system 400 includes an I/O device 408, which may be coupled with other devices via bus 412. In one embodiment, the system 400 includes a display 410.

System 400 further includes a port 414. In one embodiment, port 414 may be coupled with and handle transactions for I/O device 408. Port 414 includes a first logic unit 416 to perform a configuration change, a second logic unit 418 to receive transactions, a queue 420 to hold at least a portion of the received transactions, a third logic unit 422 to differentiate between first transactions and second transactions, wherein, according to one embodiment, the first transactions are received prior to receipt of a configuration change request, wherein the second transactions are received after receipt of the configuration change request and before the configuration change is complete, and wherein the differentiation is based on the order in which the transactions were received relative to receipt of the configuration change request, a fourth logic unit 424 to handle transactions, in which, according to one embodiment, the fourth logic unit 424 is to handle the first transactions differently than the second transactions, and a fifth logic unit 426 to receive a configuration change request, wherein the configuration change to be performed by the first logic unit 416 is in response to the configuration change request.

In one embodiment, the fourth logic unit 424 is to handle the first transactions before completion of the configuration change, and to handle the second transactions after the completion of the configuration change.

In one embodiment, the queue 420 is to hold the first transactions and the second transactions, and the third logic unit 422 is to cause a register to be programmed to a value to indicate position in the queue 420 to differentiate between the first transactions and the second transactions. In one embodiment, the register to be programmed to differentiate amongst transactions is located on port 414.

Figure 5:
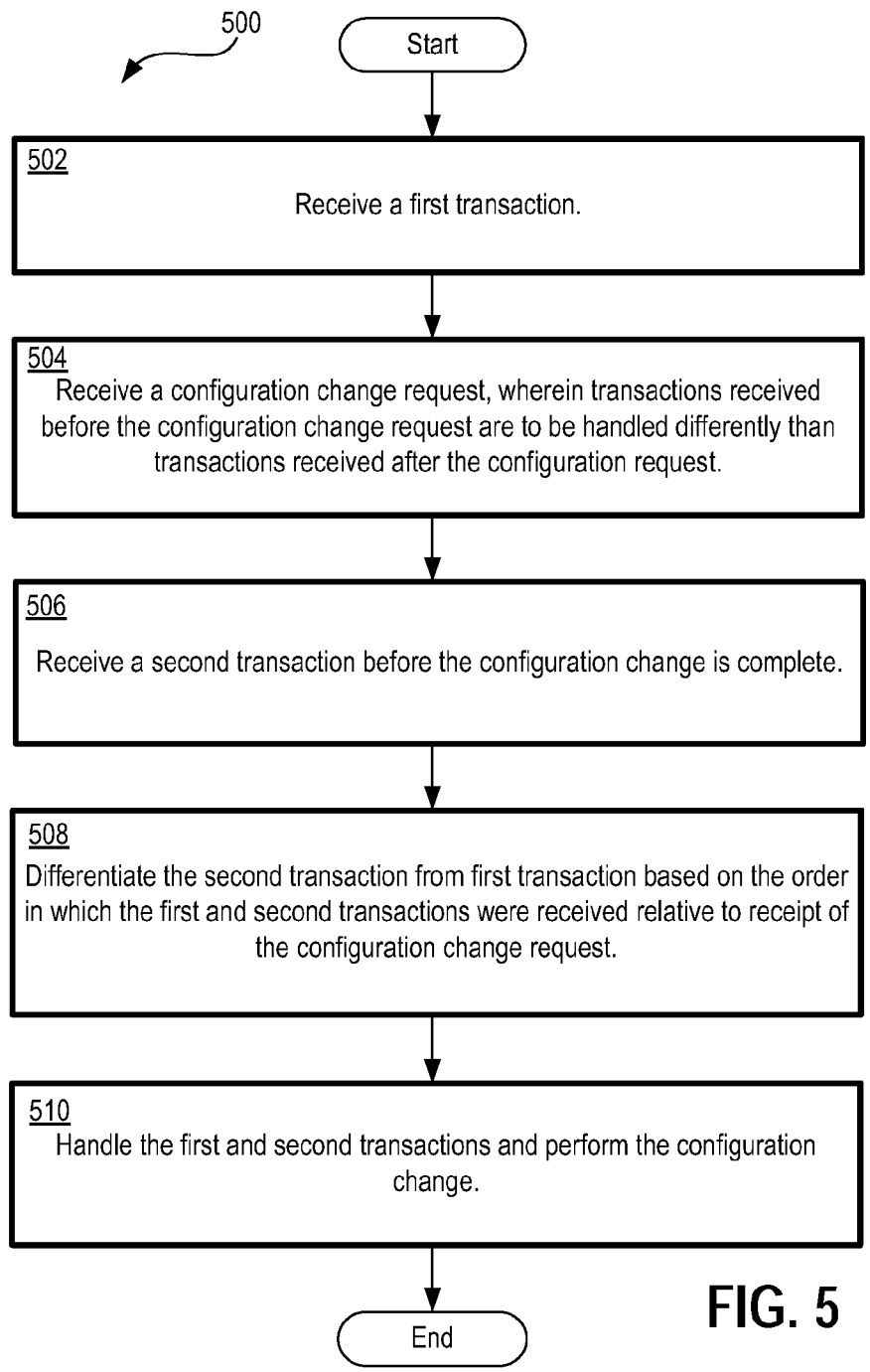
FIG. 5 is a flow diagram illustrating a method for handling transactions received after a configuration change request.

FIG. 5 is a flow diagram illustrating a method 500 for handling transactions received after a configuration change request.

In one embodiment, method 500 is performed by a hardware based system, such as system 400 set forth at FIG. 4. Some operations may be performed by a port 414 as set forth within system 400 of FIG. 4. Some of the blocks and/or operations listed below are optional in accordance with certain embodiments. The numbering of the blocks presented is for the sake of clarity and is not intended to prescribe an order of operations in which the various blocks must occur.

Method 500 begins at block 502 with processing logic for receiving a first transaction.

At block 504, a configuration change request is received. Transactions received before the configuration change request are handled differently than transactions received after the configuration request.

At block 506, a second transaction is received before the configuration change is complete.

At block 508, the second transaction is differentiated from the first transaction based on the order in which the first and second transactions were received relative to receipt of the configuration change request.

In block 510, processing logic handles the first and second transactions and performs the configuration change. For example, the configuration change request may include a reset or a link down transition, and may be part of a back-to-back configuration change request.

FIG. 6 illustrates a diagrammatic representation of a machine 600 in the exemplary form of a computer system, in accordance with one embodiment, within which a set of instructions, for causing the machine/computer system 600 to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 618 (e.g., a persistent storage device including hard disk drives), which communicate with each other via a bus 630. Main memory 604 includes an operating system (OS) 624. In one embodiment, the system 600 includes a port 634, which includes a port configuration change handler 635. In one embodiment, the port configuration change handler 635 may assist port 634 in handling configuration changes by differentiating amongst transactions based on the order in which transactions are received relative to receipt of a configuration change request. In one embodiment, port configuration change handler 635 receives a configuration change request and differentiates between first transactions and second transactions, wherein the first transactions are received prior to receipt of the configuration change request, wherein the second transactions are received after receipt of the configuration change request and before the configuration change is complete, and wherein the differentiation is based on the order in which the transactions were received relative to receipt of the configuration change request. Main memory 604 and OS 624 operate in conjunction with processing logic 626 and processor 602 to perform the methodologies discussed herein.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and functionality which is discussed herein.

The computer system 600 may further include a network interface card 608. The computer system 600 also may include a user interface 610 (such as a video display unit, a liquid crystal display (LCD), or a cathode ray tube (CRT)), an alphanumeric input device 612 (e.g., a keyboard), a cursor control device 614 (e.g., a mouse), and a signal generation device 616 (e.g., an integrated speaker). The computer system 600 may further include peripheral device 636 (e.g., wireless or wired communication devices, memory devices, storage devices, audio processing devices, video processing devices, etc.).

The secondary memory 618 may include a non-transitory machine-readable or computer readable storage medium 631 on which is stored one or more sets of instructions (e.g., software 622) embodying any one or more of the methodologies or functions described herein. The software 622 may also reside, completely or at least partially, within the main memory 604 and/or within the processor 602 during execution thereof by the computer system 600, the main memory 604 and the processor 602 also constituting machine-readable storage media. The software 622 may further be transmitted or received over a network 620 via the network interface card 608.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method performed by a system having at least a processor and a memory therein, wherein the method comprises:
   receiving first transactions at a transaction-handling logic block of the system and loading the first transactions into a queue;
   receiving a configuration change request at the transaction handling logic block after receiving the first transactions and before the first transactions completes, wherein the configuration change comprises a link down transition or a reset of the configuration of the device;
   receiving second transactions at the transaction-handling logic block and loading the second transactions into the queue, wherein the second transaction is received subsequent to receiving the configuration change request and prior to completion of a configuration change pursuant to the configuration change request;
   isolating the second transactions received and any newer incoming transactions received after receiving the configuration change request from the first transactions received prior to receiving the configuration change request by:
   programming a register with a value to indicate a position in the queue that differentiates the first transactions and the second transactions; and
   based on the register, differentiating the first transaction from the second transaction and the newer incoming transactions received after receiving the configuration change request, wherein the differentiating establishes a fence between the first and second and newer incoming transactions in the queue in relation to the link down request or reset of the configuration of the device;
   completing all of the first transactions in the queue and perform the configuration change pursuant to the configuration change request after all first one or more transactions are complete; and
   handling the second transactions differently based on the differentiation after the first transactions and configuration change complete.

2. The method of claim 1:
wherein the configuration change comprises changing a configuration of a device communicably interfaced with the system and coupled with the transaction-handling logic block.

3. The method of claim 1:
wherein programming the register further comprises programming the register to differentiate between new incoming transactions from existing transactions in the queue prior to the link down transition or the reset of the configuration of the device.

4. The method of claim 1:
wherein the system further comprises a bus; and
wherein the bus of the system implements a bus protocol which does provide hardware of the system with an option to retry transactions or to throttle transactions.

5. The method of claim 2:
wherein changing a configuration of a device comprises changing a configuration of a function of the device, wherein the device is a multifunction PCI Express device communicably interfaced with the system.

6. The method of claim 1:
wherein the configuration change request is received from within the transaction-handling logic block.

7. The method of claim 1, further comprising:
receiving a second configuration change request, wherein the second configuration change request is received prior to handling the first transaction and before receiving the second transaction; and
performing a second configuration change in response to the second configuration change request, wherein the logic block is to handle transactions received prior to receipt of the second configuration change request differently than transactions received after receipt of the second configuration change request.

8. Non-transitory computer readable storage media having instructions stored thereupon that, when executed by a system having at least a processor and a memory therein, the instructions cause the system to perform operations comprising:
receiving first transactions at a transaction-handling logic block of the system and loading the first transactions into a queue;
receiving a configuration change request at the transaction handling logic block after receiving the first transactions and before the first transactions completes, wherein the configuration change comprises a link down transition or a reset of the configuration of the device;

receiving second transactions at the transaction-handling logic block and loading the second transactions into the queue, wherein the second transaction is received subsequent to receiving the configuration change request and prior to completion of a configuration change pursuant to the configuration change request;

isolating the second transactions received and any newer incoming transactions received after receiving the configuration change request from the first transactions received prior to receiving the configuration change request by:

programming a register with a value to indicate a position in the queue that differentiates the first transactions and the second transactions; and based on the register, differentiating the first transaction from the second transaction and the newer incoming transactions received after receiving the configuration change request, wherein the differentiating establishes a fence between the first and second and newer incoming transactions in the queue in relation to the link down request or reset of the configuration of the device;

completing all of the first transactions in the queue and performing the configuration change pursuant to the configuration change request after all first one or more transactions are complete; and handling the second transactions differently based on the differentiation after the first transactions and configuration change complete.

9. The non-transitory computer readable storage media of claim 8:

wherein programming the register further comprises programming the register to differentiate between new incoming transactions from existing transactions in the queue prior to the link down transition or the reset of the configuration of the device.

10. The non-transitory computer readable storage media of claim 8, wherein the instructions cause the system to perform operations further comprising:

receiving a configuration change request, wherein the instructions cause the system to perform the configuration change in response to the configuration change request.

11. The non-transitory computer readable storage media of claim 8:

wherein the system further comprises a bus; and wherein the bus of the system implements a bus protocol which does provide hardware of the system with an option to retry transactions or to throttle transactions.

12. The non-transitory computer readable storage media of claim 8:

wherein the system further comprises a bus; and wherein the bus of the system implements a bus protocol which does provide hardware of the system with an option to retry transactions or to throttle transactions.

13. The non-transitory computer readable storage media of claim 8:

wherein the configuration change comprises changing a configuration of a device communicably interfaced with the system and coupled with the transaction-handling logic block; and wherein changing a configuration of a device comprises changing a configuration of a function of the device, wherein the device is a multifunction PCI Express device communicably interfaced with the system.

14. The non-transitory computer readable storage media of claim 8:

wherein the system is to handle transactions for a plurality of modules;

wherein the configuration change is for one of the plurality of modules of the system; and wherein a remaining portion of the plurality of modules are to continue handling transactions during the configuration change for the one of the plurality of modules.

15. The non-transitory computer readable storage media of claim 14:

wherein each of the plurality of modules is a function of a multifunction PCI Express device.

16. A system comprising:

a processor;

a memory;

a display; and a port, the port to be coupled with a device, wherein the port comprises logic for:

receiving first transactions at a transaction-handling logic block of the system and loading the first transactions into a queue;

receiving a configuration change request at the transaction handling logic block after receiving the first transactions and before the first transactions completes, wherein the configuration change comprises a link down transition or a reset of the configuration of the device;

receiving second transactions at the transaction-handling logic block and loading the second transactions into the queue, wherein the second transaction is received subsequent to receiving the configuration change request and prior to completion of a configuration change pursuant to the configuration change request;

isolating the second transactions received and any newer incoming transactions received after receiving the configuration change request from the first transactions received prior to receiving the configuration change request by:

programming a register with a value to indicate a position in the queue that differentiates the first transactions and the second transactions; and based on the register, differentiating the first transaction from the second transaction and the newer incoming transactions received after receiving the configuration change request, wherein the differentiating establishes a fence between the first and second and newer incoming transactions in the queue in relation to the link down request or reset of the configuration of the device;

completing all of the first transactions in the queue and performing the configuration change pursuant to the configuration change request after all first one or more transactions are complete; and handling the second transactions differently based on the differentiation after the first transactions and configuration change complete.

17. The system of claim 16, wherein programming the register further comprises programming the register to differentiate between new incoming transactions from existing transactions in the queue prior to the link down transition or the reset of the configuration of the device.

18. The system of claim 16:

wherein the port comprises a PCI Express port and the device is a multifunction PCI Express device.

19. The system of claim 16:

wherein the system further comprises a bus; and wherein the bus of the system implements a bus protocol which does provide hardware of the system with an option to retry transactions or to throttle transactions.

20. The system of claim 16:
wherein the configuration change comprises changing a configuration of a device communicably interfaced with the system and coupled with the transaction-handling logic block; and
wherein changing a configuration of a device comprises changing a configuration of a function of the device, wherein the device is a multifunction PCI Express device communicably interfaced with the system.

* * * * *